United States Patent
Hillman et al.

(10) Patent No.: US 10,955,652 B2
(45) Date of Patent: Mar. 23, 2021

(54) THREE-DIMENSIONAL IMAGING USING SWEPT, CONFOCALLY ALIGNED PLANAR EXCITATION WITH A POWELL LENS AND/OR DELIBERATE MISALIGNMENT

(71) Applicant: The Trustees of Columbia University in the City of New York, New York, NY (US)

(72) Inventors: Elizabeth M. C. Hillman, New York, NY (US); Venkatakaushik Voleti, Cupertino, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/336,178

(22) PCT Filed: Sep. 27, 2017

(86) PCT No.: PCT/US2017/053687
§ 371 (c)(1),
(2) Date: Mar. 25, 2019

(87) PCT Pub. No.: WO2018/064149
PCT Pub. Date: Apr. 5, 2018

(65) Prior Publication Data
US 2019/0278073 A1    Sep. 12, 2019

Related U.S. Application Data

(60) Provisional application No. 62/421,262, filed on Nov. 12, 2016, provisional application No. 62/402,011, filed on Sep. 30, 2016.

(51) Int. Cl.
*G02B 21/22* (2006.01)
*G02B 21/00* (2006.01)
(Continued)

(52) U.S. Cl.
CPC ........ *G02B 21/22* (2013.01); *G02B 21/0032* (2013.01); *G02B 21/082* (2013.01);
(Continued)

(58) Field of Classification Search
CPC .. G02B 21/22; G02B 21/0032; G02B 21/082; G02B 21/361; G02B 27/0927; G02B 27/095; G02B 27/0955
See application file for complete search history.

(56) References Cited

U.S. PATENT DOCUMENTS 4,826,299 A    5/1989   Powell
5,266,803 A    11/1993  Heffelfinger
(Continued)

FOREIGN PATENT DOCUMENTS

WO     2015109323 A2     7/2015
WO     WO-2015181068 A1 * 12/2015 ........... G02B 21/002
(Continued)

OTHER PUBLICATIONS

Ahrens et al., "Whole-brain functional imaging at cellular resolution using lightsheet microscopy", Nature Methods, Mar. 18, 2013, vol. 10(5): p. 413-420 (Abstract).
(Continued)

*Primary Examiner* — Thai Q Tran
*Assistant Examiner* — Sunghyoun Park
(74) *Attorney, Agent, or Firm* — Potomac Law Group, PLLC

(57) ABSTRACT

In a first SCAPE imaging system, a Powell lens (105) is used to expand light from a light source (100) into a sheet of illumination light. An optical system (125,131,132,140) sweeps the sheet of illumination light through a sample (145), and forms an image at a tilted intermediate image plane (170) from detected return light. A camera (190) captures images of the intermediate image plane. In a second
(Continued)

SCAPE imaging system, an optical system (125,131,132, 140) sweeps the sheet of illumination light through a sample (145), and forms an image at a tilted intermediate image plane (170) from detected return light. A camera (190) captures images of the intermediate image plane. The detection optics are deliberately misaligned with respect to a true alignment position so that a significant portion of light that would be lost at the true alignment position will arrive at the camera.

7 Claims, 7 Drawing Sheets

(51) Int. Cl.
    *G02B 21/36*     (2006.01)
    *G02B 27/09*     (2006.01)
    *G02B 21/08*     (2006.01)

(52) U.S. Cl.
    CPC ......... *G02B 21/361* (2013.01); *G02B 27/095* (2013.01); *G02B 27/0927* (2013.01); *G02B 27/0955* (2013.01)

(56) References Cited

U.S. PATENT DOCUMENTS

| | | | |
|---|---|---|---|
| 5,485,530 A | 1/1996 | Lakowicz et al. | |
| 7,710,115 B2 | 5/2010 | Hargreaves | |
| 8,254,020 B2 | 8/2012 | Holy et al. | |
| 8,290,358 B1 | 10/2012 | Georgiev | |
| 8,441,633 B2 | 5/2013 | Truong et al. | |
| 8,575,570 B2 | 11/2013 | Choi et al. | |
| 8,619,237 B2 | 12/2013 | Hillman et al. | |
| 8,679,426 B2 | 3/2014 | Barrett | |
| 8,718,351 B2 | 5/2014 | So et al. | |
| 9,357,202 B2 | 5/2016 | Pavani et al. | |
| 9,655,523 B2 | 5/2017 | Hillman et al. | |
| 10,061,111 B2 | 8/2018 | Hillman | |
| 2004/0125441 A1* | 7/2004 | Wang | G02B 5/1866 359/385 |
| 2004/0228010 A1* | 11/2004 | Wey | G02B 21/0008 359/804 |
| 2009/0250632 A1* | 10/2009 | Kempe | G02B 21/0072 250/459.1 |
| 2010/0090127 A1 | 4/2010 | Yekta et al. | |
| 2012/0140240 A1 | 6/2012 | Hillman et al. | |
| 2012/0281264 A1 | 11/2012 | Lippert et al. | |
| 2015/0042992 A1 | 2/2015 | Cui et al. | |
| 2016/0213252 A1 | 7/2016 | Hillman et al. | |
| 2016/0327779 A1 | 11/2016 | Hillman | |
| 2017/0199362 A1* | 7/2017 | Schwedt | G02B 21/0076 |
| 2018/0214024 A1 | 8/2018 | Hillman et al. | |

FOREIGN PATENT DOCUMENTS

| | | |
|---|---|---|
| WO | 2017210159 A1 | 12/2017 |
| WO | 2017210182 A1 | 12/2017 |
| WO | 2018013489 A1 | 1/2018 |
| WO | 2018052905 A1 | 3/2018 |
| WO | 2018064149 A1 | 4/2018 |
| WO | 2018089865 A1 | 5/2018 |

OTHER PUBLICATIONS

Bouchard et al., "Swept confocally-aligned planar excitation (SCAPE) microscopy for high-speed volumetric imaging of behaving organisms," Nature Photonics, Jan. 19, 2015, vol. 9(2), pp. 113-119.

Dean et al., "Deconvolution-free Subcellular Imaging with Axially Swept Light Sheet Microscopy" Biophysics Journal, vol. 108, Issue 12, pp. 2807-2815, Jun. 2015.

Dmitriev et al., "Optical probes and techniques for O2 measurement in live cells and tissue", Cellular and Molecular Life Sciences, vol. 69, Issue 12, pp. 2025-2039, Jun. 2012.

Dodt et al., "Ultramicroscopy: development and outlook," Neurophotonics, Nov. 9, 2015, vol. 2(4), pp. 041407-1-041407-8.

International Search Report and Written Opinion for Application No. PCT/US2017/053687 dated Feb. 13, 2018.

Jahn et al., "Simultaneous Fluorescence and Phosphorescence Lifetime Imaging Microscopy in Living Cells", Scientific Reports, 5:14334, Sep. 2015.

Kepshire et al., "A microcomputed tomography guided fluorescence tomography system for small animal molecular imaging", Review of Scientific Instruments, vol. 80, Issue 4, pp. 043701, Apr. 2009.

Lecoq et al., "Simultaneous two-photon imaging of oxygen and blood flow in deep cerebral vessels", Nature Medicine, vol. 17, Issue 7, pp. 893-899, Jul. 2011.

Olarte et al., "Decoupled illumination detection in light sheet microscopy for fast volumetric imaging," Optica, Aug. 4, 2015, vol. 2, No. 8, p. 702-705.

Ploschner et al., "Multimode fibre: Light-sheet microscopy at the tip of a needle", Scientific Reports, 5:18050, Dec. 2015.

Powell, "About the Powell Lens," retrieved from the Internet: http://www.laserlineoptics.com/powell_primer.html, retrieved on Nov. 24, 2017, pp. 1-4.

Prevedel et al., "Simultaneous whole-animal 3D imaging of neuronal activity using light-field microscopy", Nature Methods, vol. 11, Issue 7, pp. 727-730, May 2014.

Quirin et al., "Calcium imaging of neural circuits with extended depth-of-field light-sheet microscopy," Optics Letters, vol. 41, No. 5, pp. 855-858, Mar. 2016.

Tomer et al., "SPED light sheet microscopy: fast mapping of biological system structure and function." Cell, vol. 163, Issue 7 (Nov. 2015): 1796-1806.

\* cited by examiner

THREE-DIMENSIONAL IMAGING USING SWEPT, CONFOCALLY ALIGNED PLANAR EXCITATION WITH A POWELL LENS AND/OR DELIBERATE MISALIGNMENT

CROSS REFERENCE TO RELATED APPLICATIONS

This Application is a U.S. national stage filing under 35 U.S.C. § 371 of International Application No. PCT/US2017/053687, filed Sep. 27, 2017, which claims the benefit of U.S. Provisional Application 62/402,011 filed Sep. 30, 2016, and U.S. Provisional Application 62/421,262, filed Nov. 12, 2016, each of which is incorporated herein by reference in its entirety.

STATEMENT REGARDING FEDERALLY-SPONSORED RESEARCH

This invention was made with government support under grants NS094296, NS076628, NS063226, and NS053684 awarded by the National Institutes of Health. The Government has certain rights in the invention.

FIELD

The present invention relates to microscopy.

BACKGROUND

A 3-dimensional imaging system called swept, confocally-aligned planar excitation (SCAPE) microscopy has been developed and described in WO 2015/109323 and US 2016/0327779, each which is incorporated herein by reference in its entirety. The SCAPE system forms three dimensional microscopic images at high speed by scanning excitation light and de-scanning image light onto a light detector such that multiple depths of the sample are detected at each instant.

SUMMARY OF THE INVENTION

In some embodiments of SCAPE imaging systems, a Powell lens is used to expand light from a light source into a sheet of illumination light. An optical system sweeps the sheet of illumination light through a sample, and forms an image at an intermediate image plane from detected return light. A camera captures images of the intermediate image plane. In some embodiments of SCAPE imaging systems, an optical system sweeps the sheet of illumination light through a sample, and forms an image at an intermediate image plane from detected return light. A camera captures images of the intermediate image plane. In the latter embodiments, the optical system is deliberately misaligned with respect to a true alignment position so that a significant portion of light that would be lost at the true alignment position will arrive at the camera.

One aspect of the invention is directed to a first imaging apparatus that comprises a light source and a fourth set of optical components arranged to expand light from the light source into a sheet of illumination light, wherein the fourth set of optical components comprises a Powell lens. The first imaging apparatus also comprises a first set of optical components having a proximal end and a distal end, wherein the first set of optical components includes a first objective disposed at the distal end of the first set of optical components. The first imaging apparatus also comprises a second set of optical components having a proximal end and a distal end, wherein the second set of optical components includes a second objective disposed at the distal end of the second set of optical components. The first imaging apparatus also comprises a scanning element that is disposed proximally with respect to the proximal end of the first set of optical components and proximally with respect to the proximal end of the second set of optical components. In the first imaging apparatus, the scanning element is arranged to route the sheet of illumination light so that the sheet of illumination light will pass through the first set of optical components in a proximal to distal direction and project into a sample that is positioned distally beyond the distal end of the first set of optical components, wherein the sheet of illumination light is projected into the sample at an oblique angle, and wherein the sheet of illumination light is projected into the sample at a position that varies depending on an orientation of the scanning element. The first set of optical components routes detection light from the sample in a distal to proximal direction back to the scanning element. The scanning element is also arranged to route the detection light so that the detection light will pass through the second set of optical components in a proximal to distal direction and form an intermediate image plane at a position that is distally beyond the distal end of the second set of optical components. The first imaging apparatus also comprises a light detector array and a third set of optical components arranged to image light from the intermediate image plane onto the light detector array.

In some embodiments of the first imaging apparatus, the fourth set of optical components further comprises a telescope and a fourth objective. In some of these embodiments, the Powell lens has an apex, light from the light source is routed into the apex of the Powell lens, light that exits the Powell lens is routed into the telescope, and light that exits the telescope is routed into the fourth objective. In some of these embodiments, the Powell lens is a 30° Powell lens, and the telescope comprises a 30 mm cylindrical lens and a 50 mm cylindrical lens.

In some embodiments of the first imaging apparatus, the first set of optical components comprises a telescope that includes at least one Plossl lens. In some of these embodiments, the second set of optical components comprises a telescope that includes at least one Plossl lens.

In some embodiments of the first imaging apparatus, the light source comprises a laser. In some embodiments of the first imaging apparatus, the third set of optical components comprises an objective and at least one lens. In some embodiments of the first imaging apparatus, the intermediate image plane is stationary.

Some embodiments of the first imaging apparatus further comprise a beam splitter disposed between the proximal end of the second set of optical components and the scanning element. In these embodiments, the fourth set of optical components is arranged to route the sheet of illumination light towards the beam splitter, the beam splitter is arranged to route the sheet of illumination light arriving from the fourth set of optical components towards the scanning element, and the beam splitter is arranged to route detection light arriving from the scanning element into the proximal end of the second set of optical components.

In some embodiments of the first imaging apparatus, the fourth set of optical components is arranged to route the sheet of illumination light into the distal end of the second set of optical components, and the second set of optical components is arranged to route the sheet of illumination light in a distal to proximal direction towards the scanning element.

Another aspect of the invention is directed to a second imaging apparatus that comprises a light source and a set of optical components arranged to expand light from the light source into a sheet of illumination light, wherein the set of optical components comprises a Powell lens. The second imaging apparatus also comprises an optical system that (a) projects the sheet of illumination light into a sample at an oblique angle, wherein a position of the sheet of illumination light within the sample varies depending on an orientation of a scanning element, and (b) forms, from detection light that originates from the position of the sheet of illumination light, an image at an intermediate image plane, wherein the intermediate image plane remains stationary regardless of the orientation of the scanning element. The second imaging apparatus also comprises a light detector array and optical components arranged to image light from the intermediate image plane onto the light detector array.

In some embodiments of the second imaging apparatus, the set of optical components further comprises a telescope and an objective. In some of these embodiments, the Powell lens has an apex, light from the light source is routed into the apex of the Powell lens, wherein light that exits the Powell lens is routed into the telescope, and light that exits the telescope is routed into the objective. In some of these embodiments, the Powell lens is a 30° Powell lens, and the telescope comprises a 30 mm cylindrical lens and a 50 mm cylindrical lens.

In some embodiments of the second imaging apparatus, the optical system comprises a telescope that includes at least one Plossl lens. In some embodiments of the second imaging apparatus, the light source comprises a laser. In some embodiments of the second imaging apparatus, the optical system comprises a beam splitter that (a) routes the sheet of illumination light towards the scanning element, and (b) routes detection light towards intermediate image plane. In some embodiments of the second imaging apparatus, the sheet of illumination light is injected into the optical system adjacent to the intermediate image plane.

Another aspect of the invention is directed to a third imaging apparatus that comprises a light source; an optical element including a Powell lens that expands light from the light source into a sheet of illumination light; a beam splitter disposed in a path of the sheet of the illumination light; and a scanning element disposed in a path of the sheet of the illumination light. The third imaging apparatus also comprises a first telescope having a proximal end and a distal end, and a first objective disposed at the distal end of the first telescope; and a second telescope having a proximal end and a distal end, and a second objective disposed at the distal end of the second telescope. The beam splitter routes the sheet of illumination light towards the scanning element. The scanning element routes the sheet of illumination light into the proximal end of the first telescope. The first telescope routes the sheet of illumination light in a proximal to distal direction through the first objective, accepts a sheet of detection light through the first objective, and routes the sheet of detection light in a distal to proximal direction back to the scanning element. The scanning element routes the sheet of detection light through the beam splitter and into the proximal end of the second telescope, and the second telescope routes the sheet of detection light in a proximal to distal direction through the second objective to form a tilted intermediate image plane. The third imaging apparatus also comprises a camera optically positioned to capture images at the tilted intermediate image plane.

In some embodiments of the third imaging apparatus, the light source comprises a laser. In some embodiments of the third imaging apparatus, the first telescope comprises a Plossl lens. In some embodiments of the third imaging apparatus, the optical characteristics of the first telescope match the optical characteristics of the second telescope.

In some embodiments of the third imaging apparatus, the camera comprises a 2D image sensor positioned at a position that is remote from the tilted intermediate image plane, and optical elements including a camera objective that route light from the tilted intermediate image plane to the 2D image sensor. In some of these embodiments, an alignment of the 2D image sensor and the optical elements including the camera objective is displaced from a true alignment position in a direction that is parallel to the tilted intermediate image plane so that a significant portion of light that would be lost at the true alignment position will enter the camera objective.

In some embodiments of the third imaging apparatus, an alignment of the second telescope is displaced from a true alignment position in a direction that is perpendicular to the optical axis of the second telescope so that a significant portion of light that would be lost at the true alignment position will enter the camera objective.

Another aspect of the invention is directed to a fourth imaging apparatus that comprises a first telescope having a proximal end and a distal end, and a first objective disposed at the distal end of the first telescope. The fourth imaging apparatus also comprises a second telescope having a proximal end and a distal end, and a second objective disposed at the distal end of the second telescope. The fourth imaging apparatus also comprises a scanning element configured to (a) route detection light emanating from the proximal end of the first telescope into the proximal end of the second telescope and adjust an angle of the detection light before the detection light enters the proximal end of the second telescope, and (b) route illumination light emanating from the proximal end of the second telescope into the proximal end of the first telescope and adjust an angle of the illumination light before the illumination light enters the proximal end of the first telescope. The fourth imaging apparatus also comprises a light source and an optical element including a Powell lens and a third objective, wherein the Powell lens is arranged to expand light from the light source into a sheet of illumination light and direct the sheet of illumination light towards the third objective, and wherein the third objective is arranged with respect to the second objective so that the sheet of illumination light will exit the third objective and enter the second objective of the second telescope. In the fourth imaging apparatus, the second telescope routes the sheet of illumination light towards the scanning element. The scanning element routes the sheet of illumination light into the proximal end of the first telescope. The first telescope routes the sheet of illumination light in a proximal to distal direction through the first objective, accepts a sheet of detection light through the first objective and routes the sheet of detection light in a distal to proximal direction back to the scanning element. The scanning element routes the sheet of detection light into the proximal end of the second telescope. The second telescope routes the sheet of detection light in a proximal to distal direction through the second objective to form a tilted intermediate image plane. The fourth imaging apparatus also comprises a camera optically positioned to capture images at the tilted intermediate image plane.

In some embodiments of the fourth imaging apparatus, the light source comprises a laser. In some embodiments of the fourth imaging apparatus, the first telescope comprises a Plossl lens. In some embodiments of the fourth imaging apparatus, the optical characteristics of the first telescope match the optical characteristics of the second telescope.

In some embodiments of the fourth imaging apparatus, the camera comprises a 2D image sensor positioned at a position that is remote from the tilted intermediate image plane, and optical elements including a camera objective that route light from the tilted intermediate image plane to the 2D image sensor. In some of these embodiments, an alignment of the 2D image sensor and the optical elements including the camera objective is displaced from a true alignment position in a direction that is parallel to the tilted intermediate image plane so that a significant portion of light that would be lost at the true alignment position will enter the camera objective.

In some embodiments of the fourth imaging apparatus, an alignment of the second telescope is displaced from a true alignment position in a direction that is perpendicular to the optical axis of the second telescope so that a significant portion of light that would be lost at the true alignment position will enter the camera objective.

Another aspect of the invention is directed to a fifth imaging apparatus that comprises a light source and a fourth set of optical components arranged to expand light from the light source into a sheet of illumination light. The fifth imaging apparatus also comprises a first set of optical components having a proximal end and a distal end, wherein the first set of optical components includes a first objective disposed at the distal end of the first set of optical components. The fifth imaging apparatus also comprises a second set of optical components having a proximal end and a distal end, wherein the second set of optical components includes a second objective disposed at the distal end of the second set of optical components. The fifth imaging apparatus also comprises a scanning element that is disposed proximally with respect to the proximal end of the first set of optical components and proximally with respect to the proximal end of the second set of optical components. In the fifth imaging apparatus, the scanning element is arranged to route the sheet of illumination light so that the sheet of illumination light will pass through the first set of optical components in a proximal to distal direction and project into a sample that is positioned distally beyond the distal end of the first set of optical components, wherein the sheet of illumination light is projected into the sample at an oblique angle, and wherein the sheet of illumination light is projected into the sample at a position that varies depending on an orientation of the scanning element. The first set of optical components routes detection light from the sample in a distal to proximal direction back to the scanning element. The scanning element is also arranged to route the detection light so that the detection light will pass through the second set of optical components in a proximal to distal direction and form an intermediate image plane at a position that is distally beyond the distal end of the second set of optical components. The fifth imaging apparatus also comprises a light detector array and a third set of optical components arranged to image light from the intermediate image plane onto the light detector array. In the fifth imaging apparatus, an alignment of the light detector array and the third set of optical components is displaced from a true alignment position in a direction that is parallel to the intermediate image plane so that a significant portion of light that would be lost at the true alignment position will arrive the light detector array.

In some embodiments of the fifth imaging apparatus, the intermediate image plane is stationary. In some embodiments of the fifth imaging apparatus, the third set of optical components comprises an objective and at least one lens. In some embodiments of the fifth imaging apparatus, the fourth set of optical components comprises a second scanning element.

Some embodiments of the fifth imaging apparatus further comprise a beam splitter disposed between the proximal end of the second set of optical components and the scanning element, wherein the fourth set of optical components is arranged to route the sheet of illumination light towards the beam splitter, wherein the beam splitter is arranged to route the sheet of illumination light arriving from the fourth set of optical components towards the scanning element, and wherein the beam splitter is arranged to route detection light arriving from the scanning element into the proximal end of the second set of optical components.

In some embodiments of the fifth imaging apparatus, the fourth set of optical components is arranged to route the sheet of illumination light into the distal end of the second set of optical components, and the second set of optical components is arranged to route the sheet of illumination light in a distal to proximal direction towards the scanning element.

Another aspect of the invention is directed to a sixth imaging apparatus that comprises a light source and a fourth set of optical components arranged to expand light from the light source into a sheet of illumination light. The sixth imaging apparatus also comprises a first set of optical components having a proximal end and a distal end, wherein the first set of optical components includes a first objective disposed at the distal end of the first set of optical components. The sixth imaging apparatus also comprises a second set of optical components having a proximal end and a distal end, wherein the second set of optical components includes a second objective disposed at the distal end of the second set of optical components. The sixth imaging apparatus also comprises a scanning element that is disposed proximally with respect to the proximal end of the first set of optical components and proximally with respect to the proximal end of the second set of optical components. In the sixth imaging apparatus, the scanning element is arranged to route the sheet of illumination light so that the sheet of illumination light will pass through the first set of optical components in a proximal to distal direction and project into a sample that is positioned distally beyond the distal end of the first set of optical components, wherein the sheet of illumination light is projected into the sample at an oblique angle, and wherein the sheet of illumination light is projected into the sample at a position that varies depending on an orientation of the scanning element. The first set of optical components routes detection light from the sample in a distal to proximal direction back to the scanning element. The scanning element is also arranged to route the detection light so that the detection light will pass through the second set of optical components in a proximal to distal direction and form an intermediate image plane at a position that is distally beyond the distal end of the second set of optical components. The sixth imaging apparatus also comprises a light detector array and a third set of optical components arranged to image light from the intermediate image plane onto the light detector array. An alignment of at least a portion of the second set of optical components is displaced from a true alignment position in a direction that is perpendicular to the optical axis of the second set of optical components so that a significant portion of light that would be lost at the true alignment position will arrive at the light detector array.

In some embodiments of the sixth imaging apparatus, the entire second set of optical components is displaced from the true alignment position. In some embodiments of the sixth imaging apparatus, the second objective is displaced from the true alignment position. In some embodiments of the sixth imaging apparatus, only the second objective is displaced from the true alignment position.

In some embodiments of the sixth imaging apparatus, the intermediate image plane is stationary. In some embodiments of the sixth imaging apparatus, the third set of optical components comprises an objective and at least one lens. In some embodiments of the sixth imaging apparatus, the fourth set of optical components comprises a second scanning element.

Some embodiments of the sixth imaging apparatus further comprise a beam splitter disposed between the proximal end of the second set of optical components and the scanning element. The fourth set of optical components is arranged to route the sheet of illumination light towards the beam splitter. The beam splitter is arranged to route the sheet of illumination light arriving from the fourth set of optical components towards the scanning element. The beam splitter is arranged to route detection light arriving from the scanning element into the proximal end of the second set of optical components.

In some embodiments of the sixth imaging apparatus, the fourth set of optical components is arranged to route the sheet of illumination light into the distal end of the second set of optical components, and the second set of optical components is arranged to route the sheet of illumination light in a distal to proximal direction towards the scanning element.

Another aspect of the invention is directed to a seventh imaging apparatus that comprises a light source and a set of optical components arranged to expand light from the light source into a sheet of illumination light. The seventh imaging apparatus also comprises an optical system that (a) projects the sheet of illumination light into a sample at an oblique angle, wherein a position of the sheet of illumination light within the sample varies depending on an orientation of a scanning element, and (b) forms, from detection light that originates from the position of the sheet of illumination light, an image at an intermediate image plane, wherein the intermediate image plane remains stationary regardless of the orientation of the scanning element. The seventh imaging apparatus also comprises a light detector array and optical components arranged to image light from the intermediate image plane onto the light detector array. An alignment of the light detector array and the optical components arranged to image light from the intermediate image plane onto the light detector array is displaced from a true alignment position in a direction that is parallel to the intermediate image plane so that a significant portion of light that would be lost at the true alignment position will arrive at the light detector array.

In some embodiments of the seventh imaging apparatus, the set of optical components arranged to expand light from the light source into a sheet of illumination light comprises a second scanning element. In some embodiments of the seventh imaging apparatus, the set of optical components arranged to expand light from the light source into a sheet of illumination light comprises at least one Powell lens. In some embodiments of the seventh imaging apparatus, the set of optical components arranged to expand light from the light source into a sheet of illumination light comprises at least one cylindrical lens.

In some embodiments of the seventh imaging apparatus, the optical system comprises a beam splitter that (a) routes the sheet of illumination light towards the scanning element, and (b) routes detection light towards the intermediate image plane.

In some embodiments of the seventh imaging apparatus, the sheet of illumination light is injected into the optical system adjacent to the intermediate image plane.

Another aspect of the invention is directed to an eighth imaging apparatus that comprises a light source and an optical element that expands light from the light source into a sheet of illumination light. The eighth imaging apparatus also comprises a beam splitter disposed in a path of the sheet of the illumination light and a scanning element disposed in a path of the sheet of the illumination light. The eighth imaging apparatus also comprises a first telescope having a proximal end and a distal end, and a first objective disposed at the distal end of the first telescope; and a second telescope having a proximal end and a distal end, and a second objective disposed at the distal end of the second telescope. In the eighth imaging apparatus, the beam splitter routes the sheet of illumination light towards the scanning element. The scanning element routes the sheet of illumination light into the proximal end of the first telescope. The first telescope routes the sheet of illumination light in a proximal to distal direction through the first objective, accepts a sheet of detection light through the first objective and routes the sheet of detection light in a distal to proximal direction back to the scanning element. The scanning element routes the sheet of detection light through the beam splitter and into the proximal end of the second telescope. The second telescope routes the sheet of detection light in a proximal to distal direction through the second objective to form a tilted intermediate image plane. The eighth imaging apparatus also comprises a camera optically positioned to capture images at the tilted intermediate image plane, wherein the camera includes a 2D image sensor positioned at a position that is remote from the tilted intermediate image plane and optical elements including a camera objective that route light from the tilted intermediate image plane to the 2D image sensor. In the eighth imaging apparatus, an alignment of the 2D image sensor and the optical elements including the camera objective is displaced from a true alignment position in a direction that is parallel to the tilted intermediate image plane so that a significant portion of light that would be lost at the true alignment position will enter the camera objective.

In some embodiments of the eighth imaging apparatus, the optical characteristics of the first telescope match the optical characteristics of the second telescope. In some embodiments of the eighth imaging apparatus, the optical element that expands light from the light source into the sheet of illumination light comprises a second scanning element. In some embodiments of the eighth imaging apparatus, the optical element that expands light from the light source into the sheet of illumination light comprises at least one Powell lens. In some embodiments of the eighth imaging apparatus, the optical element that expands light from the light source into the sheet of illumination light comprises at least one cylindrical lens.

Another aspect of the invention is directed to a ninth imaging apparatus that comprises a light source; an optical element that expands light from the light source into a sheet of illumination light; a beam splitter disposed in a path of the sheet of the illumination light; and a scanning element disposed in a path of the sheet of the illumination light. The ninth imaging apparatus also comprises a first telescope having a proximal end and a distal end, and a first objective disposed at the distal end of the first telescope; and a second telescope having a proximal end and a distal end, and a second objective disposed at the distal end of the second telescope. In the ninth imaging apparatus, the beam splitter routes the sheet of illumination light towards the scanning element. The scanning element routes the sheet of illumination light into the proximal end of the first telescope. The first telescope routes the sheet of illumination light in a proximal to distal direction through the first objective, accepts a sheet of detection light through the first objective and routes the sheet of detection light in a distal to proximal direction back to the scanning element. The scanning element routes the sheet of detection light through the beam splitter and into the proximal end of the second telescope. The second telescope routes the sheet of detection light in a proximal to distal direction through the second objective to form a tilted intermediate image plane. The ninth imaging apparatus also comprises a camera optically positioned to capture images at the tilted intermediate image plane. In the ninth imaging apparatus, an alignment of at least a portion of the second telescope is displaced from a true alignment position in a direction that is perpendicular to the optical axis of the second telescope so that a significant portion of light that would be lost at the true alignment position will enter the camera.

In some embodiments of the ninth imaging apparatus, the entire second telescope is displaced from the true alignment position. In some embodiments of the ninth imaging apparatus, the second objective is displaced from the true alignment position. In some embodiments of the ninth imaging apparatus, only the second objective is displaced from the true alignment position.

In some embodiments of the ninth imaging apparatus, the optical characteristics of the first telescope match the optical characteristics of the second telescope. In some embodiments of the ninth imaging apparatus, the camera comprises a 2D image sensor positioned at a position that is remote from the tilted intermediate image plane, and optical elements including a camera objective that route light from the tilted intermediate image plane to the 2D image sensor.

In some embodiments of the ninth imaging apparatus, the optical element that expands light from the light source into the sheet of illumination light comprises a second scanning element. In some embodiments of the ninth imaging apparatus, the optical element that expands light from the light source into the sheet of illumination light comprises at least one Powell lens. In some embodiments of the ninth imaging apparatus, the optical element that expands light from the light source into the sheet of illumination light comprises at least one cylindrical lens.

Another aspect of the invention is directed to a tenth imaging apparatus that comprises a first telescope having a proximal end and a distal end, and a first objective disposed at the distal end of the first telescope; and a second telescope having a proximal end and a distal end, and a second objective disposed at the distal end of the second telescope. The tenth imaging apparatus also comprises a scanning element configured to (a) route detection light emanating from the proximal end of the first telescope into the proximal end of the second telescope and adjust an angle of the detection light before the detection light enters the proximal end of the second telescope, and (b) route illumination light emanating from the proximal end of the second telescope into the proximal end of the first telescope and adjust an angle of the illumination light before the illumination light enters the proximal end of the first telescope. The tenth imaging apparatus also comprises a light source and an optical element that expands light from the light source into a sheet of illumination light and directs the sheet of illumination light into a third objective. In the tenth imaging apparatus, the third objective is arranged with respect to the second objective so that the sheet of illumination light emanating from the third objective will enter the second objective of the second telescope. The second telescope routes the sheet of illumination light towards the scanning element, and the scanning element routes the sheet of illumination light into the proximal end of the first telescope. The first telescope routes the sheet of illumination light in a proximal to distal direction through the first objective, accepts a sheet of detection light through the first objective and routes the sheet of detection light in a distal to proximal direction back to the scanning element. The scanning element routes the sheet of detection light into the proximal end of the second telescope, and the second telescope routes the sheet of detection light in a proximal to distal direction through the second objective to form a tilted intermediate image plane. The tenth imaging apparatus also comprises a camera optically positioned to capture images at the tilted intermediate image plane, wherein the camera includes a 2D image sensor positioned at a position that is remote from the tilted intermediate image plane and optical elements including a camera objective that route light from the tilted intermediate image plane to the 2D image sensor. In the tenth imaging apparatus, an alignment of the 2D image sensor and the optical elements including the camera objective is displaced from a true alignment position in a direction that is parallel to the tilted intermediate image plane so that a significant portion of light that would be lost at the true alignment position will enter the camera objective.

In some embodiments of the tenth imaging apparatus, the optical characteristics of the first telescope match the optical characteristics of the second telescope. In some embodiments of the tenth imaging apparatus, the optical element that expands light from the light source into the sheet of illumination light comprises a second scanning element. In some embodiments of the tenth imaging apparatus, the optical element that expands light from the light source into the sheet of illumination light comprises at least one Powell lens. In some embodiments of the tenth imaging apparatus, the optical element that expands light from the light source into the sheet of illumination light comprises at least one cylindrical lens.

Another aspect of the invention is directed to an eleventh imaging apparatus that comprises a first telescope having a proximal end and a distal end, and a first objective disposed at the distal end of the first telescope. The eleventh imaging apparatus also comprises a second telescope having a proximal end and a distal end, and a second objective disposed at the distal end of the second telescope. The eleventh imaging apparatus also comprises a scanning element configured to (a) route detection light emanating from the proximal end of the first telescope into the proximal end of the second telescope and adjust an angle of the detection light before the detection light enters the proximal end of the second telescope, and (b) route illumination light emanating from the proximal end of the second telescope into the proximal end of the first telescope and adjust an angle of the illumination light before the illumination light enters the proximal end of the first telescope. The eleventh imaging apparatus also comprises a light source and an optical element that expands light from the light source into a sheet of illumination light and directs the sheet of illumination light into a third objective. In the eleventh imaging apparatus, the third objective is arranged with respect to the second objective so that the sheet of illumination light emanating from the third objective will enter the second objective of the second telescope. The second telescope routes the sheet of illumination light towards the scanning element. The scanning element routes the sheet of illumination light into the proximal end of the first telescope. The first telescope routes the sheet of illumination light in a proximal to distal direction through the first objective, accepts a sheet of detection light through the first objective and routes the sheet of detection light in a distal to proximal direction back to the scanning element. The scanning element routes the sheet of detection light into the proximal end of the second telescope. The second telescope routes the sheet of detection light in a proximal to distal direction through the second objective to form a tilted intermediate image plane. The eleventh imaging apparatus also comprises a camera optically positioned to capture images at the tilted intermediate image plane. In the eleventh imaging apparatus, an alignment of at least a portion of the second telescope is displaced from a true alignment position in a direction that is perpendicular to the optical axis of the second telescope so that a significant portion of light that would be lost at the true alignment position will enter the camera objective.

In some embodiments of the eleventh imaging apparatus, the entire second telescope is displaced from the true alignment position. In some embodiments of the eleventh imaging apparatus, the second objective is displaced from the true alignment position. In some embodiments of the eleventh imaging apparatus, only the second objective is displaced from the true alignment position.

In some embodiments of the eleventh imaging apparatus, the optical characteristics of the first telescope match the optical characteristics of the second telescope.

In some embodiments of the eleventh imaging apparatus, the camera comprises a 2D image sensor positioned at a position that is remote from the tilted intermediate image plane, and optical elements including a camera objective that route light from the tilted intermediate image plane to the 2D image sensor.

In some embodiments of the eleventh imaging apparatus, the optical element that expands light from the light source into the sheet of illumination light comprises a second scanning element. In some embodiments of the eleventh imaging apparatus, the optical element that expands light from the light source into the sheet of illumination light comprises at least one Powell lens. In some embodiments of the eleventh imaging apparatus, the optical element that expands light from the light source into the sheet of illumination light comprises at least one cylindrical lens.

Another aspect of the invention is directed to a twelfth imaging apparatus that comprises a light source, a cylindrical lens or a scanning element that expands light from the light source into a sheet of light, a beam splitter disposed in a path of the sheet of light, and a scanning element disposed in a path of the sheet of light. The twelfth imaging apparatus also comprises a first telescope having a proximal end and a distal end, and a first objective disposed at the distal end of the first telescope. The twelfth imaging apparatus also comprises a second telescope having a proximal end and a distal end, and a second objective disposed at the distal end of the second telescope. In the twelfth imaging apparatus, the beam splitter routes the sheet of light towards the scanning element. The scanning element routes the sheet of light into the proximal end of the first telescope. The first telescope routes the sheet of light in a proximal to distal direction through the first objective, accepts detection light through the first objective and routes the detection light in a distal to proximal direction back to the scanning element. The scanning element routes the detection light through the beam splitter and into the proximal end of the second telescope. The second telescope routes the detection light in a proximal to distal direction through the second objective to form a tilted intermediate image plane. The twelfth imaging apparatus also comprises a camera optically positioned to capture images of the tilted intermediate image plane. In the twelfth imaging apparatus, the light sheet is automatically aligned to the camera image plane.

In some embodiments of the twelfth imaging apparatus, the alignment of the light sheet to the camera image plane is implemented in a closed-loop fashion using feedback from the camera.

Another aspect of the invention is directed to a thirteenth imaging apparatus that comprises a light source, a cylindrical lens or a scanning element that expands light from the light source into a sheet of light, a beam splitter disposed in a path of the sheet of light, and a scanning element disposed in a path of the sheet of light. The thirteenth imaging apparatus also comprises a first telescope having a proximal end and a distal end, and a first objective disposed at the distal end of the first telescope. The thirteenth imaging apparatus also comprises a second telescope having a proximal end and a distal end, and a second objective disposed at the distal end of the second telescope. In the thirteenth imaging apparatus, the beam splitter routes the sheet of light towards the scanning element. The scanning element routes the sheet of light into the proximal end of the first telescope. The first telescope routes the sheet of light in a proximal to distal direction through the first objective, accepts detection light through the first objective and routes the detection light in a distal to proximal direction back to the scanning element. The scanning element routes the detection light through the beam splitter and into the proximal end of the second telescope. The second telescope routes the detection light in a proximal to distal direction through the second objective to form a tilted intermediate image plane. The thirteenth imaging apparatus also comprises a camera optically positioned to capture images of the tilted intermediate image plane, the camera including a 2D sensor; an optical steering element configured to adjust a position of an image that is incident on the 2D sensor; and a controller configured to issue commands to the optical steering element to cause the image that is incident on the 2D sensor to move to a central region of the 2D sensor.

In some embodiments of the thirteenth imaging apparatus, the optical steering element comprises at least one steering mirror on the detection arm. In some embodiments of the thirteenth imaging apparatus, the at least one steering mirror is incorporated into an image splitter.

BRIEF DESCRIPTION OF THE DRAWINGS

Various embodiments are described in detail below with reference to the accompanying drawings, wherein like reference numerals represent like elements.

DESCRIPTION OF THE PREFERRED EMBODIMENTS

A variety of embodiments for implementing imaging using swept, confocally aligned planar excitation (SCAPE) are disclosed in WO 2015/109323 and US 2016/0327779, each of which is incorporated herein by reference in its entirety.

Section 1: Using Powell Lens Based Optics for Light Sheet Formation

Figure 1:
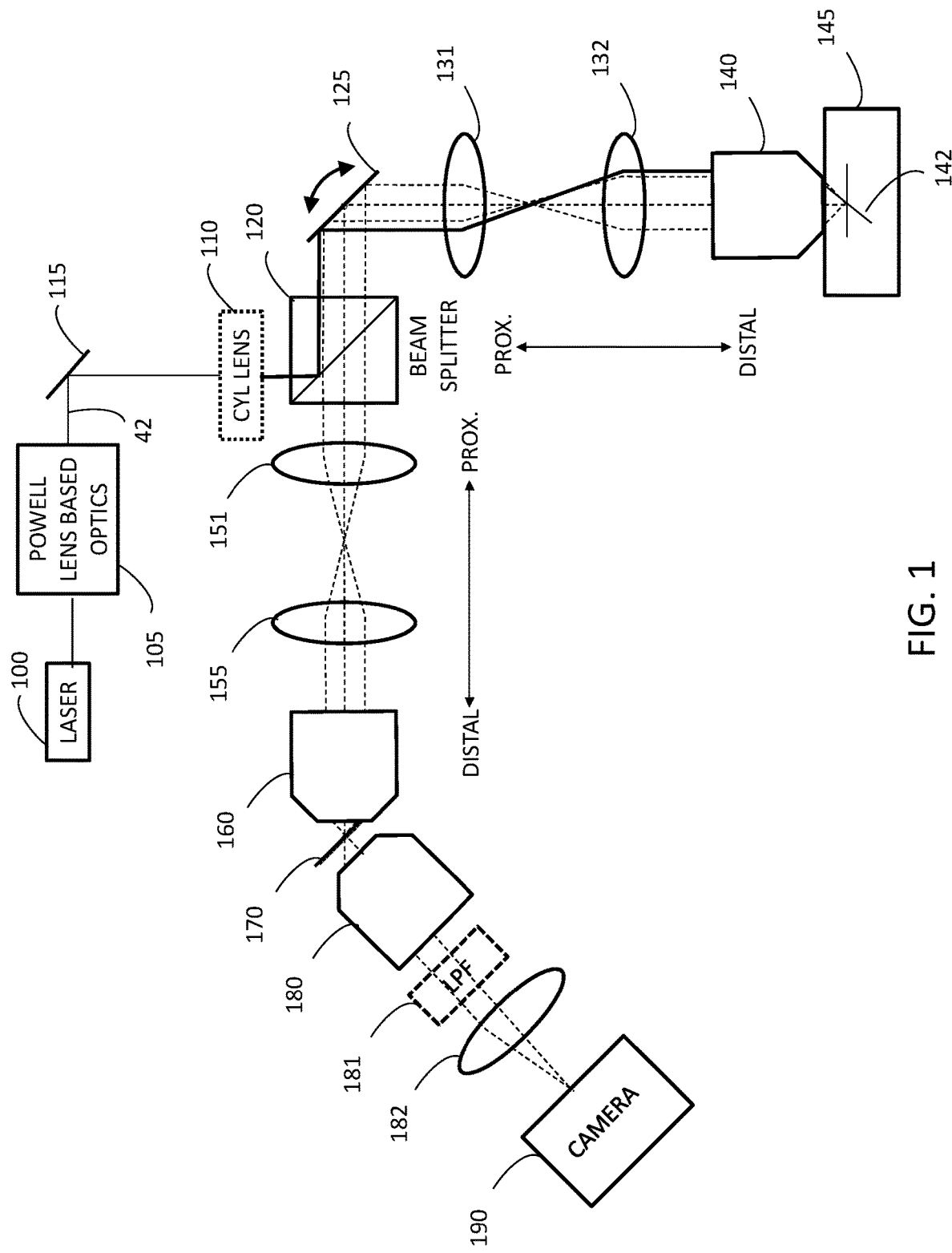
FIG. 1 depicts a first embodiment of a SCAPE imaging system that uses Powell lens based optics to improve the shape of the light sheet that enters the sample.

FIG. 1 is a first embodiment of a SCAPE system. Note that in FIG. 1 and in the rest of this application, illumination light is depicted using solid lines and return light (i.e., detection light) is depicted using dashed lines. In the FIG. 1 embodiment, light from the light source (e.g., a laser 100 or a LED) is expanded from a pencil beam into a sheet by Powell lens based optics 105. The use of Powell lens based optics is particularly advantageous for forming the light sheet 142 because the Powell lens helps generate a more uniform light sheets. Using a Powell lens advantageously decreases the distance needed to make a wide sheet and can also provide a more uniform profile of the light sheet 142 at the sample, which is an improvement with respect to the Gaussian distribution of the light sheets that are obtained when conventional cylindrical lenses are used to form the light sheet. More specifically, the Gaussian light sheets formed using conventional cylindrical lenses are brighter in the middle and dimmer at the edges. In contrast, the Powell lens based optics 105 provides a more uniform light sheet over the entire illuminated area, which can be more light efficient and can provide improved dynamic range at the sample.

Figure 2A:
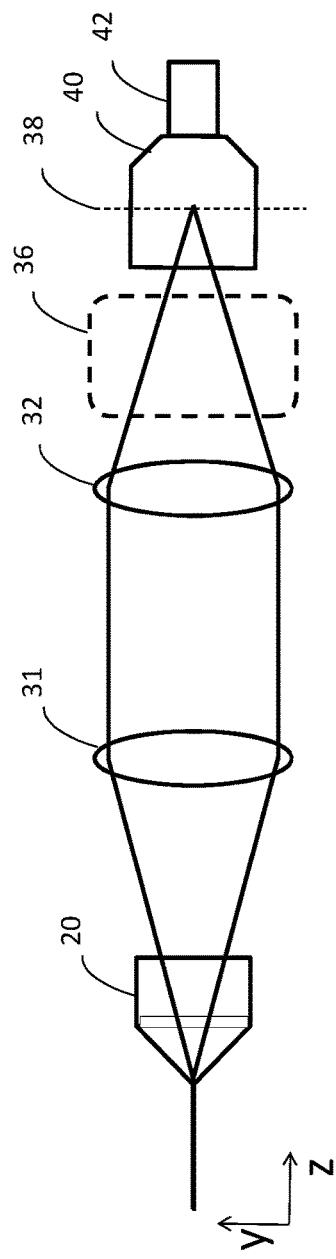
FIG. 2A depicts front, top, and side views of a Powell lens.
Figure 2B:
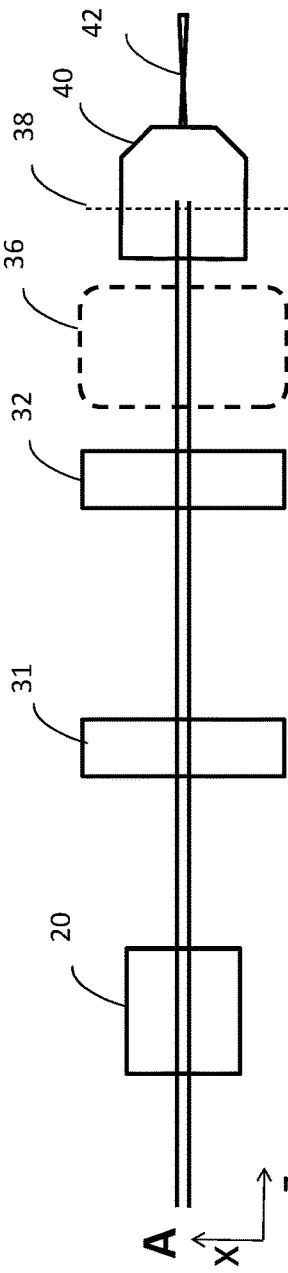
FIGS. 2B and 2C depict top and side views, respectively, of one embodiment of the Powell lens based optics for use in the FIG. 1 embodiment.
Figure 2C:
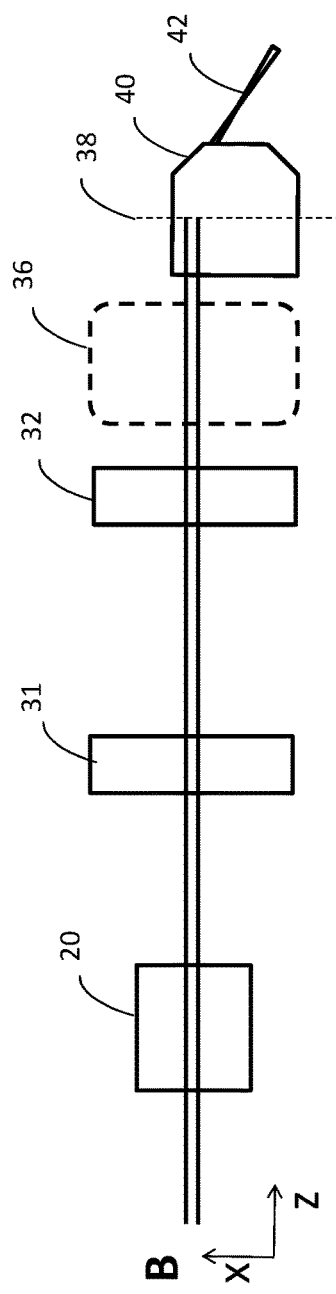

FIG. 2A depicts a front view 20f, a top view 20t, and a side view 20s of a Powell lens. FIGS. 2B and 2C depict top and side views, respectively, of one embodiment that can serve as the Powell lens based optics 105 (depicted in FIG. 1). In this embodiment, the incoming laser light (or, in alternative embodiments, non-collimated light) travels in the Z direction and enters the apex of the Powell lens 20. The Powell lens 20 expands the input beam into a fan beam. The fan beam then passes into a telescope formed from two cylindrical lenses 31, 32, and the telescope focuses the sheet of light onto back focal plane 38 of an objective 40. The output sheet of light 42 then exits the objective 40. Optionally, additional optical components 36 may be incorporated into the optical path. A comparison of the top view (FIG. 2B) and the side view (FIG. 2C) shows the configuration of the sheet of light 42 that exits the objective 40.

Figure 2D:
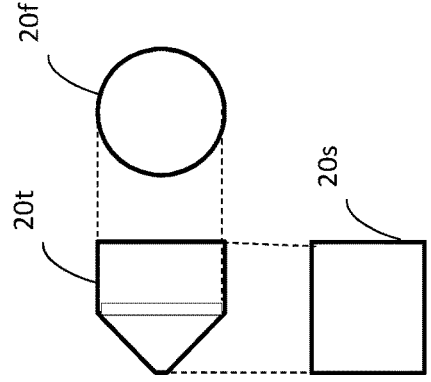
FIG. 2D depicts the light path for the FIG. 2B/C embodiment when the sheet of light that enters the objective arrives at the edge of the objective.

FIG. 2D shows what happens when the sheet of light that enters the objective 40 arrives at the edge of the objective. More specifically, instead of passing through the objective 40 without bending about the Y axis (as in FIG. 2C), the sheet of light is deflected about the Y axis as shown in FIG. 2D. The angle of deflection will depend on the distance between the center of the objective 40 and the point at which the light sheet enters the objective 40.

One example of a set of parameters that is suitable for implementing the configuration depicted in FIGS. 2B-2D is to use a 30° Powell lens, a 30 mm cylindrical lens for the first cylindrical lens 31, and a 50 mm cylindrical lens for the second cylindrical lens 32. A wide variety of alternative parameters can also be used, as will be appreciated by persons skilled in the relevant arts.

Returning to FIG. 1, the sheet of light 42 is routed (e.g., by one or more routing mirrors 115) into a beam splitter 120 (e.g., a dichroic beam splitter). Optionally, a cylindrical lens 110 may be included in the optical path between the Powell based optics 105 and the beam splitter 120. The sheet of light is reflected by the beam splitter 120 towards a scanning element 125. In some embodiments, this scanning element 125 comprises a rapidly moving galvanometer mirror. In alternative embodiments, the scanning element 125 could be implemented using a rapidly moving prism or any of a variety of alternative designs including MEMS light guides, SLM, etc., that will be apparent to persons skilled in the relevant arts or apparent from the references incorporated above.

After being rerouted by the scanning element 125, the sheet of light continues down the illumination arm in a proximal to distal direction through a first set of optical components (e.g., lenses 131, 132 and first objective 140). In some preferred embodiments, a Plossl lens configuration is used for one or both of the lenses 131, 132 to reduce the field curvature, which helps maintain the light sheet quality as the light sheet goes through the objective 140 and into the sample. In other embodiments, an alternative telescope lens design may be used (including but not limited to Huygens and Kellner designs). The sheet of light then enters the tissue sample 145 at an oblique angle to penetrate the tissue sample along the Z axis, resulting in a sheet of light 142. When the scanning element 125 moves (e.g., due to motion of the galvanometer mirror), it causes the position of the sheet of light 142 within the sample to translate. Thus, the position of the sheet of illumination light 142 within the sample varies depending on the orientation of the scanning element 125.

The illumination light may excite fluorescence in the sample 145 or it may simply illuminate the sample, and the illuminated region is imaged. Depending on the embodiment, image contrast can be provided by intrinsic fluorescence or reflectance contrast, or through introduction of fluorescent markers, beads, dyes, or other substances.

The path of the image light from the sample to the detector first passes through the first set of optical components 131-140 in a distal to proximal direction and back to the scanning element 125. From there, the image light passes through the dichroic beam splitter 120 and into the detection arm. The detection arm includes a second set of optical components (e.g., lenses 151, 155 and second objective 160). The image light passes through these components 151-160 in a proximal to distal direction and forms an intermediate image plane 170. Because the sheet of light entered the sample at an oblique angle, the intermediate image plane corresponding to the section of the sample illuminated by the light sheet 142 will be tilted with respect to the optical axis of lenses 151, 155. One of the advantages of this configuration of SCAPE is that the position of the intermediate image plane 170 remains stationary, regardless of changes in the position of the sheet of light 142 within the sample.

In some embodiments, the first set of optical components 131-140 in the illumination arm matches the second set of optical components 151-160 in the detection arm. The same scanning element 125 is used in both the illumination path and the detection path. This configuration is advantageous because it cancels out certain optical distortions that are difficult to cancel using alternative approaches, which makes the tilted intermediate image plane 170 more faithfully resemble the light sheet 142 in the sample 145. In some situations, however, the distortions introduced by a mismatch between the first and second sets of optical components may be acceptable or even desirable (e.g., when the differences in magnification are used to reduce the angle of the tilted intermediate image plane).

Note that in the FIG. 1 embodiment, the beam splitter 120 is positioned between the second set of optical components 151-160 and the scanning element 125. But in alternative embodiments (not shown), the beam splitter may be positioned somewhere within the second set of optical components 151-160 (e.g., between elements 155 and 160 in FIG. 1). In either case, the beam splitter 120 will route the incoming illumination light towards the scanning element 125, and the scanning element 125 will route the detection light so that it (a) passes through the beam splitter 120 and (b) enters the proximal end of the second set of optical components 151-160 (but not necessarily in that order).

In order to capture the image that appears at the tilted intermediate image plane 170, a variety of approaches may be used. In the FIG. 1 embodiment, a magnifier is used to rotate and expand the image and route it to a light detector array (e.g., camera 190). This magnifier includes a third objective 180 and additional optical components (e.g., lens 182 and optional long pass filter 181). The light detector array (e.g., camera 190) captures images of the tilted intermediate image plane 170.

SCAPE-based systems can advantageously acquire high-quality 3D image frames at high frame rates with reasonable depth of penetration. Advantageously, SCAPE acquires either a complete plane of pixels having a depth direction (for embodiments that have a true sheet of light) or a complete line of pixels having a depth direction (for embodiments that have a virtual sheet of light) at any given instant. This provides a dramatic speed advantage with respect to competing technologies where only a single depth can be imaged at any given instant. This speed advantage is particularly useful for in vivo imaging, because the subject being imaged will either be moving (e.g., in the case of the heart) or at the very least, susceptible to movement.

Figure 3:
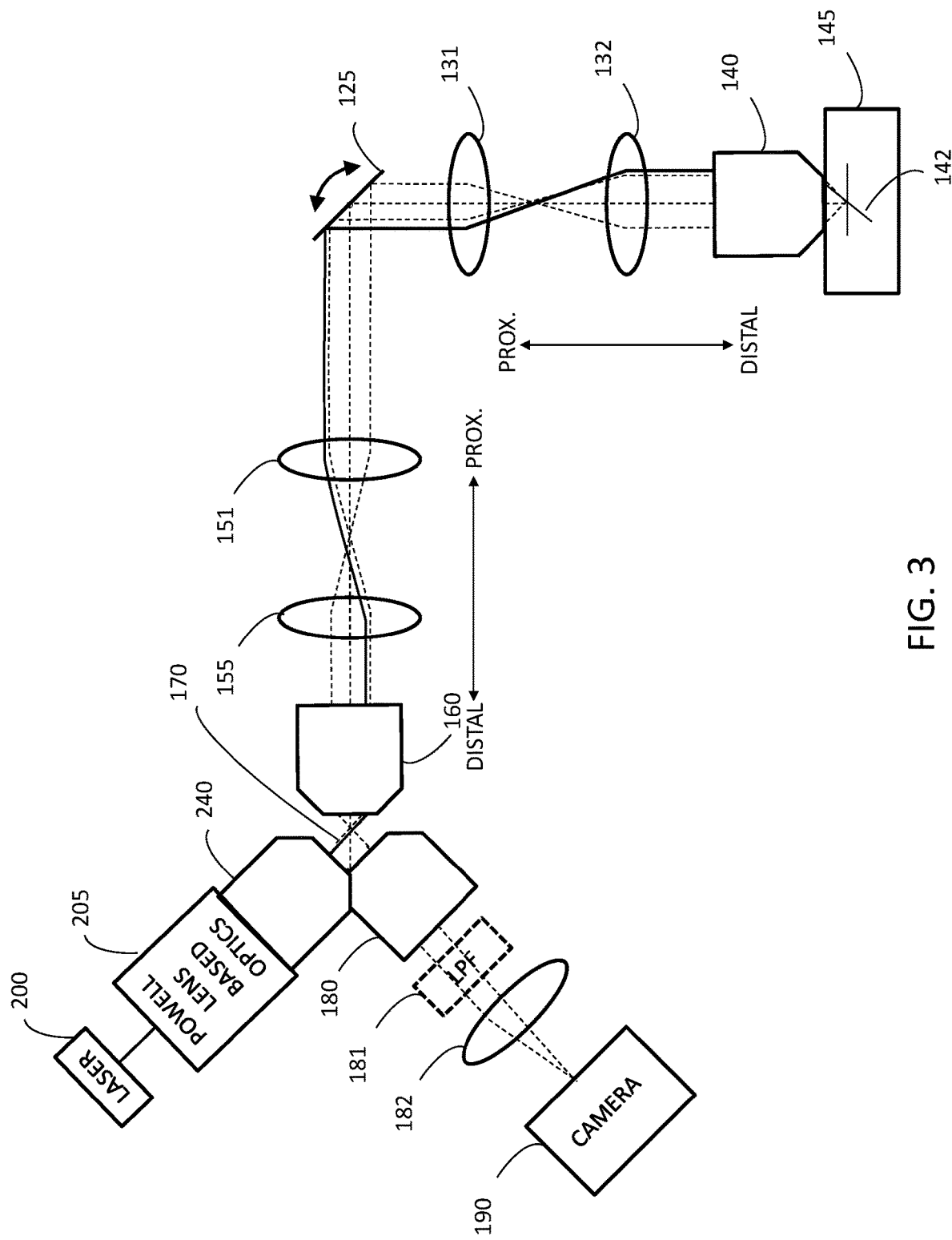
FIG. 3 depicts another embodiment of a SCAPE imaging system that uses Powell lens based optics to improve the shape of the light sheet that enters the sample.

FIG. 3 is another embodiment of a SCAPE system that is similar to the FIG. 1 embodiment, but uses an alternative approach for introducing the illumination light into the system that does not rely on a dichroic beam splitter. Instead, light from the light source (e.g., laser 200 or a LED) is expanded from a pencil beam into a sheet by Powell lens based optics 205. The design of the Powell lens based optics 205 in this FIG. 3 embodiment is similar to the design of the Powell lens based optics 105 discussed above in connection with FIGS. 1-2. (Note that the fourth objective lens 240 depicted in FIG. 3 corresponds to the objective lens 40 depicted on the right side of FIGS. 2B-D.) Optionally, a spatial light modulator (SLM, not shown) may be incorporated into the illumination path at some point prior to the fourth objective lens 240 for implementing patterning, shaping, and/or aberration correction, etc.

The sheet of illumination light exits the fourth objective 240 and enters the distal end of the second set of optical components 151-160. The sheet of illumination light then passes through the second set of optical components 151-160 in a distal to proximal direction (i.e., to the right in FIG. 3) until it reaches the scanning element 125. Subsequently, the path of the illumination light through the first set of optical components 131-140 and into the sample of the FIG. 3 embodiment resembles that of the FIG. 1 embodiment described above. In addition, the path of the detection light between the sample 145 and the tilted intermediate image plane 170 in the FIG. 3 embodiment resembles that of the FIG. 1 embodiment described above. Capturing the image at the tilted intermediate image plane 170 may also be implemented as described above in connection with FIG. 1.

Using Powell lens based optics 205 in this FIG. 3 embodiment provides the same advantages discussed above in connection with FIG. 1. But in addition, the FIG. 3 embodiment provides another very significant advantage. As explained above in connection with FIG. 1, matching the components 131, 132, 140 in the illumination arm with the corresponding components 151, 155, 160 in the detection arm cancels out certain optical distortions, so that the tilted intermediate image plane 170 will more faithfully resemble the light sheet 142 in the sample 145. This same matching of components will also cause the sheet of illumination light 142 in the sample to faithfully resemble the sheet of illumination light that enters the second objective 160 (via the fourth objective 240). Thus, when Powell lens based optics 205 are used to project a thin and relatively uniform light sheet from the fourth objective 240 into the second objective 160, a relatively faithful copy of that thin and relatively uniform light sheet will be projected into the sample as light sheet 142, which will ultimately generate a cleaner image. This FIG. 3 embodiment therefore advantageously improves light sheet formation in the sample by using the aberrations in the second objective 160 to correct for the matching aberrations that would otherwise be introduced by the first objective 140.

In SCAPE systems, it is advantageous to optimize out of plane light collection and transmission. More specifically, it is advantageous to relay light coming from below and above the primary objective lens's focal plane. To accomplish this, it is important to consider transmission of this light through the lenses, scanners, and optical system to ensure maximal throughput. The same is true in preserving illumination light getting to the sample to form the best possible light sheet, especially in the case of introducing illumination light at the second objective lens (as illustrated in the FIG. 3 embodiment), since this light will have objective-specific wavefront properties that is preferably preserved to more perfectly map the light sheet to the sample. This effect is illustrated in FIG. 4.

Figure 4:
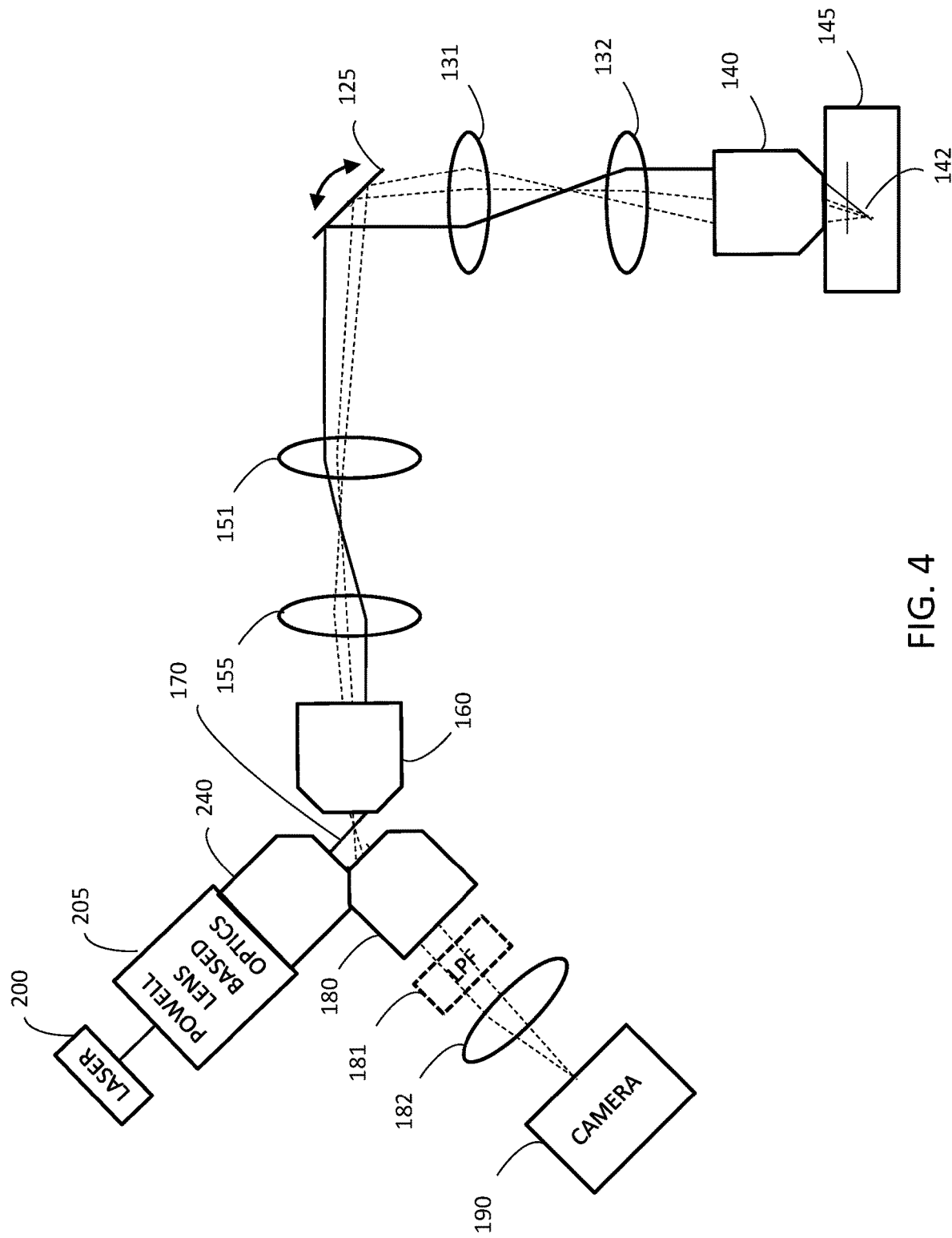
FIG. 4 depicts the path of photons originating from a region deeper than the focal plane of the primary objective in the FIG. 3 embodiment.

FIG. 4 depicts the path of photons originating from a region deeper than the focal plane of the primary objective in the FIG. 3 embodiment. This path in depicted in dashed lines. The origin of these photons may be fluorescent light excited by the deeper part of the light sheet 142. This light propagates back through the optical components at non-standard angles and with relative convergence and divergence compared to the rays focused at/coming from the primary objective lens's focal plane. The use of large lenses, scanning mirrors and apertures will enable more of this light to get to the detector, improving field of view, signal to noise, and resolution. The use of lenses optimized for transmission of light at their edges is also an important consideration to avoid aberrations.

Section 2: Using Deliberate Misalignment to Capture Additional Light

Deliberate misalignment is an interesting way to route more light into the camera with a relatively minimal reduction in image quality. Although deliberate misalignment will be explained below in the context of the FIG. 1 embodiment, the same concept may be applied to the FIG. 3 embodiment.

Figure 5:
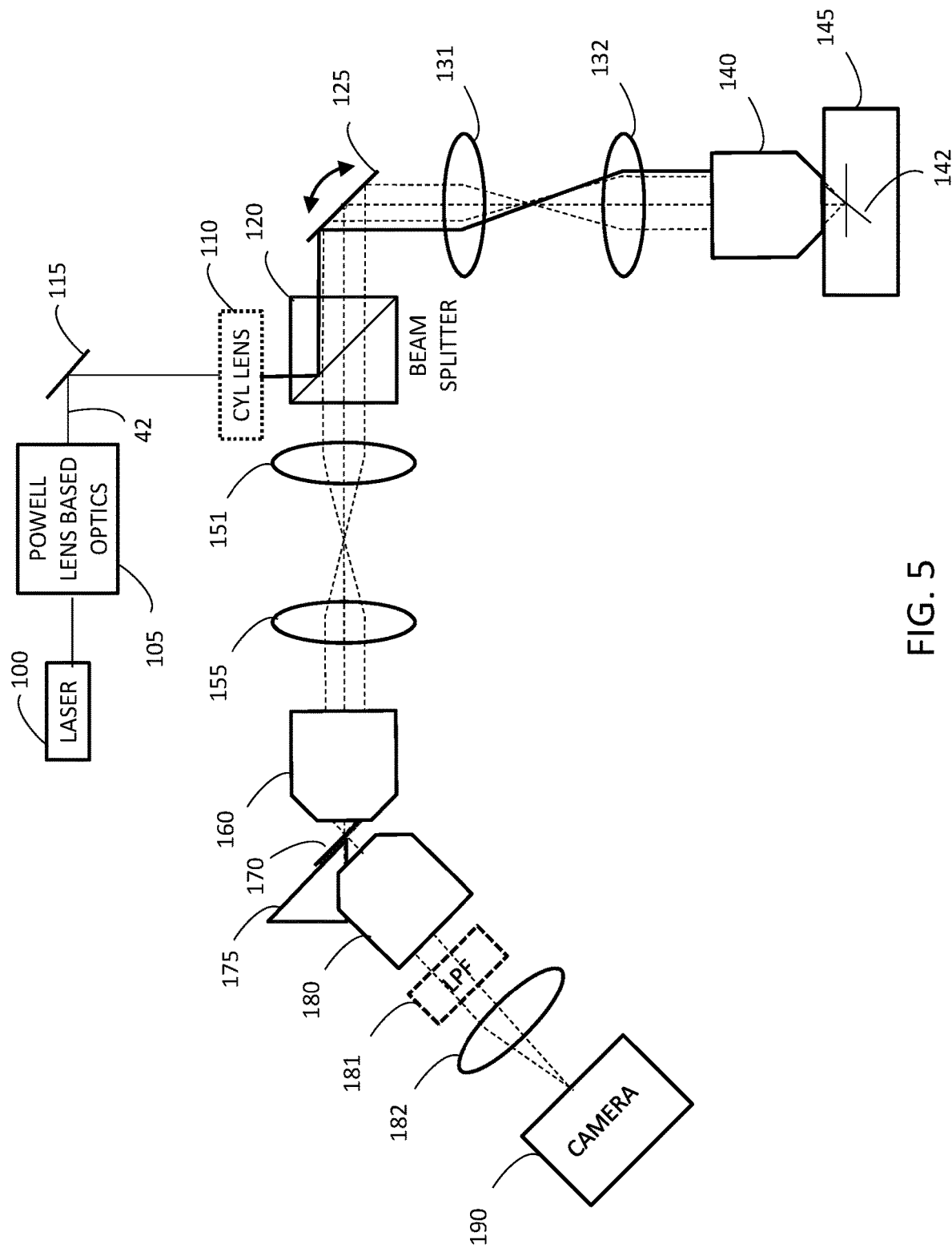
FIG. 5 depicts how a large amount of light is lost in the FIG. 1 embodiment.

FIG. 5 is a duplicate of FIG. 1 that also depicts how a large amount of light 175 is lost in the FIG. 1 embodiment because that light 175 does not enter the third objective 180. This occurs because the intermediate image plane 170 is tilted, and the arm that includes the camera 190 is ordinarily aligned with a tilt that matches the tilt of the intermediate image plane.

Figure 6:
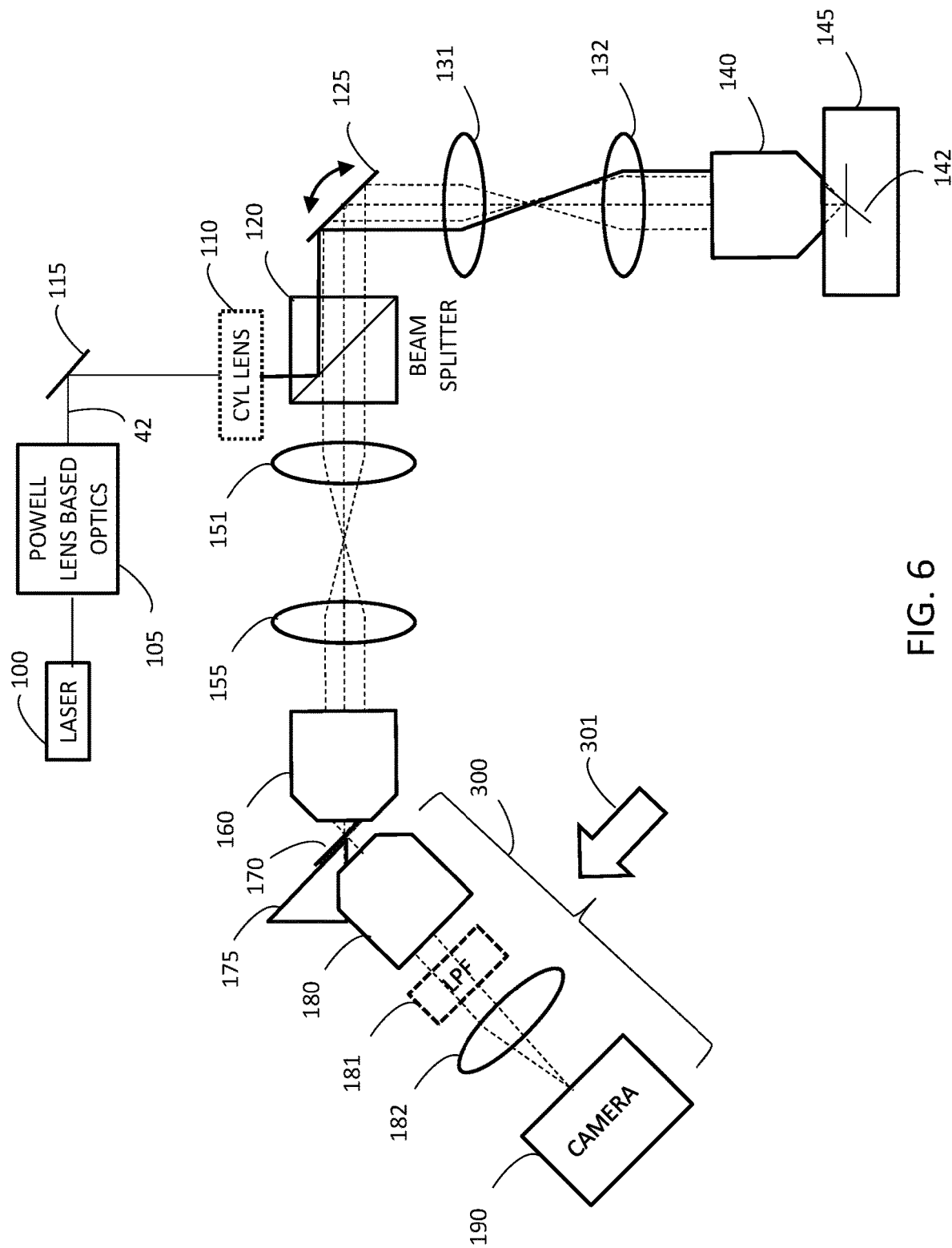
FIG. 6 depicts how some of the light that is lost in FIG. 5 can be captured using a first deliberate misalignment technique.

FIG. 6 is a duplicate of FIG. 5 that describes a first deliberate misalignment technique for capturing some of the light 175 that was lost in the FIG. 5 embodiment. More specifically, if the arm 300 that includes the third objective 180, the tube lens 182, and the camera 190 is pushed in the direction of the arrow 301 (i.e., parallel to the tilted intermediate image plane 170) with respect to the true alignment position, a significant portion of the lost light 175 that was lost using the FIG. 5 alignment (i.e., the true alignment) will now enter the third objective 180 and subsequently arrive at the camera 190. This reduction in light loss can increase the amount of light arriving at the camera 190 by, for example, at least an extra 10%, at least an extra 25%, or at least an extra 50%. And this additional light will result in an improved image quality. Note that this deliberate misalignment of the arm 300 can introduce a change in the angle of the light behind the third objective 180, and translates the image on the camera 190. But it is possible to correct for this translation using appropriately designed steering mirrors (not shown).

Figure 7:
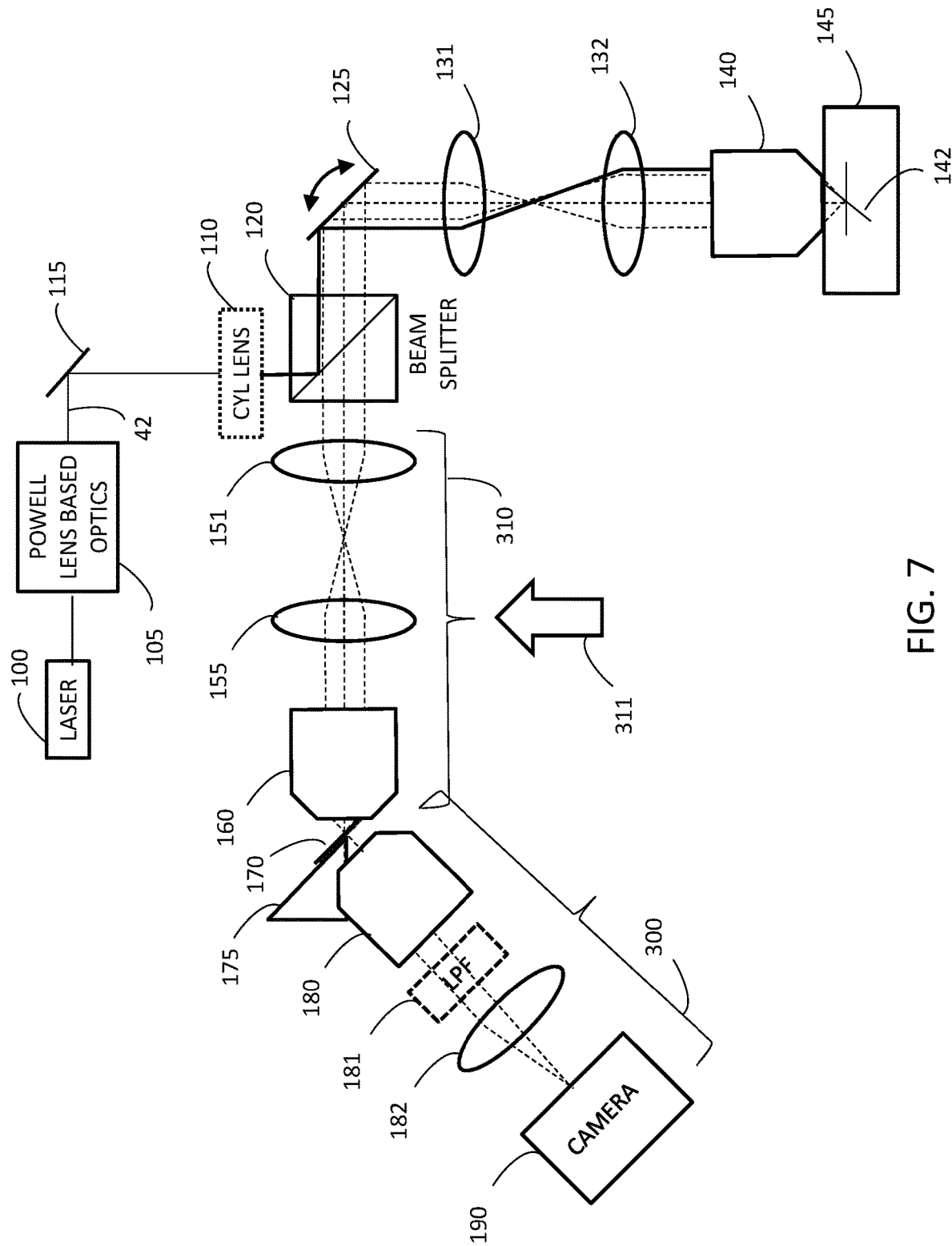
FIG. 7 depicts how some of the light that is lost in FIG. 5 can be captured using a second deliberate misalignment technique.

FIG. 7 is another duplicate of FIG. 5 that describes a second deliberate misalignment technique for capturing some of the light 175 that was lost in the FIG. 5 embodiment. More specifically, if both the detection arm 310 (which includes the telescope 151, 155 and the second objective 160) and the arm 300 (which includes the third objective 180, the tube lens 182, and the camera 190) are pushed in the direction of the arrow 311 (i.e., perpendicular to the optical axis of the detection arm 310) with respect to the true alignment position, a significant portion of the lost light 175 that was lost using the FIG. 5 alignment (i.e., the true alignment) will reach the camera 190. This reduction in light loss can increase the amount of light arriving at the camera 190 by, for example, at least an extra 10%, at least an extra 25%, or at least an extra 50%.

Note that in the example depicted in FIG. 7, the entire detection arm 310 (i.e., the second set of optical components 151-160) is displaced from the true alignment position, together with all of the components 180-190 that are disposed distally beyond the detection arm 310. But in alternative embodiments (not shown), one or more individual components within the detection arm 310 may be displaced from the true alignment position instead of misaligning the entire detection arm 310. For example, only the second objective 160 may be displaced from the true alignment position in a direction perpendicular to the optical axis of the detection arm 310, independently of the rest of the detection arm 310. This would provide access to parts of the lens's numerical aperture that would not be utilized under a true alignment. In turn, this could allow collection of a significant portion of light by the camera 190 that would otherwise have been lost.

Note that the techniques described in this section (i.e., using deliberate misalignment to capture additional light) is not limited to embodiments of SCAPE that use Powell lens based optics to improve the properties of the sheet of illumination light that enters the sample. To the contrary—these techniques are applicable to a wide variety of alternative embodiments that use different techniques for forming the sheet of illumination light. Examples of such embodiments include the use of conventional cylindrical lenses and/or SLMs to expand a pencil-shaped beam of light into a sheet; or using an auxiliary scanning element to scan the pencil shaped beam so as to create a virtual sheet of light.

Section 3: Optional Features and Alternative Embodiments of SCAPE

In some embodiments, referred to herein as "Di-SCAPE" the sample can be illuminated from either side of the primary objective lens. In some of these embodiments, resulting images could be mapped onto one or two cameras. In these embodiments, a reconstruction would yield a more isotropic point spread function.

In some embodiments that have inverted/plate-reader configurations, a block of FEP or similar material is used to provide an equivalent of immersion in liquid.

In some embodiments, a static 'dwell-mode' is implemented for imaging large samples where the sample could be translated across the field of view. This may be useful for rapid imaging of CLARITY cleared specimens of large extent and/or serial sectioning configurations.

In some embodiments, the primary objective lens is 'hanging in the air' to enable inverted/upright and even straight-ahead operation of the SCAPE system within one product.

In some embodiments, in addition to the SCAPE mode of imaging, a 'confocal mode' of the system (with high NA illumination) is implemented. These embodiments can perform line scanning or even point scanning of the same samples, optionally with serial depth imaging to give the use the chance to switch between slow, very high resolution imaging and fast 3D imaging.

In some embodiments, the magnification is a variable parameter in the system. Lower magnification in the detection arm could be achieved with much larger aperture, low magnification lenses if needed, to maintain detection NA. Scaling this magnification in a secondary stage may be used to yield both large and smaller fields of view. In some applications, this configuration is preferable to having only a small field of view, and should be achievable with minimal/modest degradation in optical resolution.

Some embodiments are configured to read between 50-300 rows of the camera permitting up to 50 volumes per second based on up to 2400 fps acquisition.

Some embodiments use a large galvo as the scanning element 125, because the galvo can be slow, and allows a 2× magnification to be used for the primary objective lens 140 (and thus provides a shorter/smaller light path). In some embodiments, the first telescope's magnification places the beam at the edge of the back focal plane of the objective lens 140 to form the oblique sheet. Depending on the objective, this can be up to 1 cm. In these embodiments, if a 1× telescope is used, the size of the galvo mirror is preferably at least the hypotenuse of the objective back aperture in size. Alternatively, if a very small galvo is used, the magnification should preferably be at least 3×.

Some embodiments rely on imaging the scanner to different positions in the primary objective lens, which can result in a light sheet that tilts as it translates, or even which only changes its angle.

Some embodiments of a two-photon microscope image the scanner to the back aperture (the entrance hole of the objective) to ensure uniformity of field during the scan, whereas clipping will occur during scanning if the back aperture is not located at the back focal plane. These embodiments can achieve 600-1000 micron fields of view when scanning. These parameters can be useful in designing a custom objective for SCAPE.

In some embodiments, the SCAPE camera is used to implement sample positioning because the SCAPE camera itself already shows the field of view (albeit with skewed focus).

Some embodiments include the ability to adjust the line length of the sheet, out to perhaps 1 mm, but also permit reduction of the sheet to avoid excess sample illumination if a smaller field of view is desired (this is also important when using image splitting across the camera chip). This configuration could also afford the opportunity to adjust the sheet angle, relative position etc., optionally in a closed-loop fashion. All of these could also be achieved with other optical components including variable apertures, moving mirrors, SLMs, etc.

In some embodiments, refocusing of the third objective lens is implemented to account for cover glass/sample related shifts in the sheet position at the sample.

In some embodiments, FEP or similar cover slips are used to match refractive index, or the use of phantoms that match the geometry of the sample (e.g. a glass coverslip over beads in agar) to enable pre-alignment of the system prior to sample placement (e.g. closed-loop). On-the-fly optimization of alignment of the sheet within the sample is also possible (ensuring the use of low light level previews). Pre-programed adjustments for different samples can optionally be incorporated.

Some embodiments of SCAPE can be operated in three modes. The first mode is the 'preview mode' which uses very low power illumination of the sample (e.g. 0.05 mW) and long camera integration times (e.g. 100 ms). This enables finding and orienting the sample with minimal photodamage. The second mode is the 'fast scanning' mode which typically collects 80-250 rows of the camera at the highest possible frame rate. Laser power is maximized to ensure reasonable signal to noise without excessive photobleaching. Repeated scans are acquired at between 5 and 40 volumes per second, depending on the number of images collected across the scan range of the sample. The range of this scan is another parameter that can be adjusted (e.g. you could take 100 images across a 1 mm scan range (10 micron step size), or 200 images across a 200 micron scan range (1 micron step size)). The third mode is the 'high resolution scanning' mode which performs a sweep of the sample, acquiring images at many positions across the sample (e.g. every 0.3 microns, with relatively low power and longer integration times such that total scan time is 1-5 seconds). This image can provide high quality structural scanning with good signal to noise of an intact sample.

In some embodiments, an x-y view preview similar to what is used in confocal microscopes is included, optionally in a low power mode acquiring at 1-2 volumes per second. These embodiments can provide a simultaneous 3-plane (or more) confocal-like preview to the user if desired. A depth section could also be used as a preview. Both of these could be configured quite easily from streamed camera output (with each plane being a single camera row).

Advantageously, SCAPE removes the need for high repetition rate lasers that currently constrain conventional point-scanning two-photon implementations (where pixel rates cannot exceed pulse rates). In some embodiments, SCAPE achieves higher speed performance using lower repetition rate lasers (e.g., fiber lasers and Ytterbium pump lasers in combination with optical parametric oscillators or amplifiers). In some embodiments (especially those that use lower repetition rates) coherent Raman variants, second harmonic generation imaging, and other non-linear microscopy techniques that require pulsed excitation (or pulsed illumination) may be implemented.

In some embodiments, a linear detector for SCAPE imaging is used in concert with x-y scanners. This configuration brings the ability to use non-conventional linear detectors such as SPADs, APD, or PMT arrays as well as line-scan cameras which could yield higher speed read-outs than camera-based detection. In these embodiments, direct detection in the intermediate oblique image plane is feasible since two-photon users may be content with a smaller number (e.g. 10) of perhaps widely spaced depth planes corresponding to detectors with a larger pitch between them (since x-y sample density would be governed by the x-y scanners only). Notably, linear-SCAPE has the same 'optical sectioning' advantages as the current trend of synchronizing line-scanning for sheet formation to the rolling shutter of a 2D camera in conventional SPIM. Here, the detected line (or subset of lines) would act as a confocal slit, reducing out of plane light, which can be valuable both for single and two-photon implementations.

In some embodiments, an area detector may be used to measure the profile of the linear PSF using techniques similar to those used in Zeiss's Airyscan systems. These embodiments allow deconvolution for image improvement with higher signal to noise.

It will be appreciated that the modules, processes, systems, and sections described above can be implemented in hardware, hardware programmed by software, software instruction stored on a non-transitory computer readable medium or a combination of the above. For example, a method for controlling the scanning and de-scanning elements and for sampling and storing image data and for constructing three-dimensional models from the image data can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, Lab VIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, optics, digital data filtering, optical sensor systems and/or computer programming arts.

Moreover, embodiments of the disclosed method, system, and computer program product can be implemented in software executed on a programmed general-purpose computer, a special purpose computer, a microprocessor, or the like.

It is, thus, apparent that there is provided, in accordance with the present disclosure, SCAPE-based imaging system. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. An imaging apparatus comprising:
a light source;
a set of optical components arranged to expand light from the light source into a sheet of illumination light, wherein the set of optical components comprises a Powell lens;
an optical system that includes a first objective having an optical axis, a second objective having an optical axis, and a scanning element, wherein the optical system is configured to (a) project the sheet of illumination light into a sample at an oblique angle with respect to the optical axis of the first objective, wherein a position of the sheet of illumination light within the sample varies depending on an orientation of the scanning element, and (b) form, from detection light that originates from the position of the sheet of illumination light, an image at an intermediate image plane that is tilted with respect to the optical axis of the second objective, wherein the intermediate image plane remains stationary regardless of the orientation of the scanning element;
a light detector array; and
optical components arranged to image light from the intermediate image plane onto the light detector array.

2. The apparatus of claim 1, wherein the set of optical components further comprises a telescope and an objective.

3. The apparatus of claim 2, wherein the Powell lens has an apex, wherein light from the light source is routed into the apex of the Powell lens, wherein light that exits the Powell lens is routed into the telescope, and wherein light that exits the telescope is routed into the objective.

4. The apparatus of claim 3, wherein the Powell lens is a 30° Powell lens, and wherein the telescope comprises a 30 mm cylindrical lens and a 50 mm cylindrical lens.

5. The apparatus of claim 1, wherein the optical system comprises a telescope that includes at least one Plossl lens.

6. The apparatus of claim 1, wherein the optical system comprises a beam splitter that (a) routes the sheet of illumination light towards the scanning element, and (b) routes detection light towards the intermediate image plane.

7. The apparatus of claim 1, wherein the sheet of illumination light is injected into the optical system adjacent to the intermediate image plane.

* * * * *